2,414,202

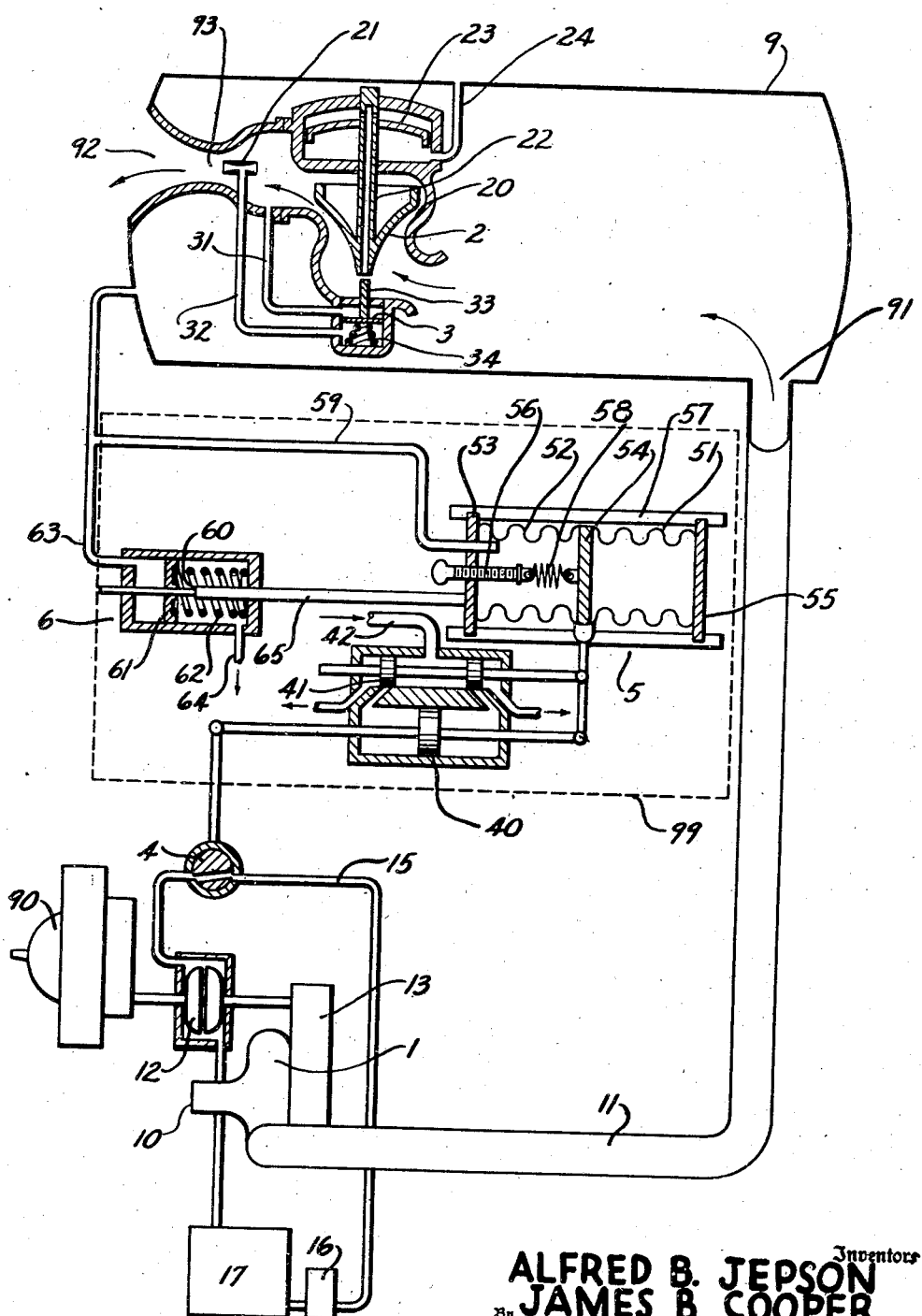
Jan. 14, 1947. A. B. JEPSON ET AL 2,414,202
SUPERCHARGER AND EXHAUST VALVE CONTROL MEANS FOR PRESSURIZED CABINS
Filed July 4, 1942
ALFRED B. JEPSON
JAMES B. COOPER
Inventors
By Reynolds & Beach
Attorneys Patented Jan. 14, 1947

UNITED STATES PATENT OFFICE 2,414,202

SUPERCHARGER AND EXHAUST VALVE CONTROL MEANS FOR PRESSURIZED CABINS

Alfred B. Jepson and James B. Cooper, Seattle, Wash., assignors to Boeing Aircraft Company, Seattle, Wash., a corporation of Washington Application July 4, 1942, Serial No. 449,742

6 Claims. (Cl. 98—1.5)

The maintenance of pressure within aircraft cabins or like enclosures at high altitudes, at values to support life and reasonable activity without at the same time overstressing the necessarily light structure, has received much thought recently. The support of life and reasonable activity in such a pressure cabin requires not merely maintenance of pressure at a suitable value within the cabin, but also a continual admission of fresh air and withdrawal of vitiated air. There must be, in other words, adequate ventilation, which implies a flow-through, yet the pressure must nevertheless be maintained at a suitable value, elevated above external atmospheric pressure at most altitudes. Indeed it may be somewhat elevated above external pressure at all altitudes above take-off altitude.

To achieve ventilation, and to maintain pressure, without so rapid a rate of flow-through as to be drafty and harmful, and to be wasteful of power, there must be maintained a delicate and proper balance between inflow and outflow. This has been accomplished in part in Price Patent No. 2,208,554 by regulating inflow in accordance with flow conditions, or rate of flow, and by regulating outflow in accordance with some cabin pressure factor, balancing the one against the other. In the Price patent both such controls were valves, and since the inlet valve was arranged to hold back such flow as might otherwise have been obtained from the supercharger which was of constant speed or connected to a propelling engine to be of substantially constant speed, power was used unnecessarily, in order that the supercharger might have adequate capacity when the requirements were the greatest. This difficulty was solved by the system of the co-pending application of Alfred B. Jepson and James B. Cooper, Serial No. 415,603, filed Oct. 18, 1941, by employing a supercharger variable in speed in accordance with flow conditions, and by employing as in the Price system, an outflow controlling valve variable in accordance with a cabin pressure factor.

It is also possible, and in some cases it may be preferable, to, in effect, reverse the control factors in their relationship to inflow and outflow, and arrangements to that end are disclosed in this application. For example, whereas in the Jepson and Cooper application, Serial No. 415,603, the rate of inflow was variable in accordance with flow conditions, in the present application the inflow is controlled in rate in accordance with a cabin pressure factor, and whereas in the Jepson and Cooper application outflow was controlled under the influence of a cabin pressure factor, in this application outflow is controlled in accordance with flow conditions. In any case, however, each reflects on the other, and the cabin pressure is the ultimate control factor, and serves to maintain pressure within the cabin elevated above the external pressure, at least from certain low altitudes upward, in some definite relationship. In addition there is also provided, preferably, a control coordinated with and affecting the other controls in such a way as to be capable always of overriding the normal controls. This overriding control would be, ordinarily, a differential-pressure control, though it might be of a different nature. It is such a control as is capable of effecting such change in cabin pressure as will prevent the cabin pressure at any time from exceeding the external pressure by a value which bears some definite relationship to external pressure.

The normally operative pressure control, which may be referred to as the absolute pressure control, may in the present instance, control the effective speed of a supercharger, and thereby its rate of delivery, reflected in the rate of inflow to the cabin. The overriding differential pressure control may affect the outflow valve to cause its greater opening upon any tendency to exceed the selected differential, or it may act upon the inflow control to prevent such speed of the supercharger being attained as will, at the corresponding rate of outflow, produce a pressure in the cabin in excess of the selected differential.

With these exceptions and differences the present system resembles the system of the Jepson and Cooper application, Serial No. 415,603 and to a large degree the principles of the present arrangement may be varied in its application in different ways, as may be done in that application, and to accomplish various related but specifically different ends.

The accompanying drawing shows the present system in diagrammatic form, it being understood that the details of the structure, sustaining wings, propulsive engines, and the like are either omitted or shown only in diagrammatic fashion, and purely for the purposes of illustrating the principles of the present invention.

The figure is a diagrammatic view, with parts in section, illustrating a cabin, and the inlet and outflow controls therefor, and the automatic controls for maintenance of proper cabin pressure under all conditions.

The sealed cabin is diagrammatically represented at 9, and has an inflow port 91 and an outflow port 92, the latter leading to the atmosphere. This cabin is part of an airplane capable of rising to high altitudes, for instance 20,000 to 40,000 feet, under the power of propulsive engines, diagrammatically represented at 90.

Air under pressure is supplied to the interior of the cabin 9 by such means as a supercharger 1, receiving air through an inlet 10 and delivering it through a conduit 11 to the cabin inflow port 91. The supercharger 1 may be driven in various ways, being shown as connected to one of the propelling engines 90 through a fluid drive 12, the effective power transmission of which is variable in accordance with the amount of fluid retained within its casing, thence through gearing within a gear box 13. The amount of fluid acting upon the fluid drive 12 is variable, as will be later explained in detail, hence the speed of the supercharger 1 with relation to its driving engine 90 is variable, preferably automatically in accordance with a cabin pressure factor, as will be made clear hereafter.

It will now be clear that the valve 2, being flow-controlled, may be regulated to maintain constant flow at the desired rate, by proper constriction of the outflow port 92. If the supercharger's speed were only sufficient to replace the air thus discharged, the cabin pressure would not rise, but since the supercharger can be speeded up, and in the arrangement shown its speed increases automatically with decrease of cabin pressure, this increase of supercharger speed results in an increase of cabin pressure. Thus, while the present arrangement is the reverse of that in Serial No. 415,603 in the sense that now the inflow is pressure-controlled instead of flow-controlled, and the outflow is flow-controlled instead of pressure-controlled, nevertheless the two are comparable in the sense that, in both instances the cabin pressure is regulated by varying the speed of the supercharger.

To these ends we provide an outflow valve 2, movable towards and from its seat 20 to regulate outflow past a venturi 93 leading to the outflow port 92. Such position of the outflow valve 2 is under automatic control of flow-sensitive means, and these flow-sensitive means may be disposed to be sensitive to the flow through the venturi 93, as by the sub-venturi 21 shown, or to flow from the cabin towards the valve 2, or to flow through the conduit 11 into the cabin. The effect is substantially the same, for it is the flow through the cabin which governs the position of the pressure-controlling valve 2.

This valve is in many respects similar to the inflow valve of the Price patent referred to above. It is shown as a conical valve, movable towards and from its seat to regulate flow, having a hollow stem 22 open to cabin pressure at its lower end, and opening at its upper end into the space above a piston 23 (or diaphragm) of larger size than the valve. The servo piston 23 is arranged for bleeding of pressure, or for flow or controlled leakage, from its upper or high pressure side to its lower or low pressure side. The low pressure side of the piston is connected by the duct 24 to atmosphere, which is under almost all conditions at a lower pressure than that within the cabin. The result is that the servo piston, acting against valve forces, created by differential pressures and outflow acting on the valve, serves to close the valve 2, but the amount of closing and its position is determined by the amount of opening through the hollow stem 22.

The latter is controlled, under the influence of flow, by a plus pressure duct 31 and a negative pressure duct 32, the latter connected to the sub-venturi 21, which ducts 31 and 32 are connected to the opposite sides of a plunger 3 carrying a stem 33, biased to move toward and to close the entrance to the hollow stem 22 by a spring 34. At normal flow rates the end of the stem 33 is maintained in equilibrium, spaced a few thousandths of an inch from the end of the hollow stem 22, and thereby the latter is maintained in turn in a position of equilibrium. If the flow rate increases, the stem 33 is lowered, the pressure above the servo piston 23 is increased more rapidly than it can be bled away past the piston, by reason of greater access through the hollow stem 22, and the valve 2 tends to follow the stem 33 downwardly, restoring parts to equilibrium in a now more greatly closed position of the outflow valve 2. If the flow rate tends to decrease, parts move in the opposite direction into a new position of equilibrium, and thus the flow rate is always moderate, and substantially constant, spring 34 being light so that the change in flow under equilibrium conditions for various positions of stem 33 is negligible.

The speed of the supercharger 1, it will be remembered, and hence supply of adequate amounts of air at suitable pressure to the cabin, is under control of the amount of fluid within the fluid drive unit 12. Less fluid within this unit 12 slows down the speed of the supercharger; more fluid within the fluid drive unit speeds up the supercharger, assuming a constant speed for the propelling engine 90. Accordingly a control valve 4 is connected in the fluid line 15, between the pump 16 drawing from a reservoir 17 and the fluid drive unit 12, and automatic means are provided for the regulation of the position of the control valve 4 in accordance with one or more pressure factors related to the pressure within the cabin.

As typifying a means to this end, there has been shown a servo piston 40, connected to operate the valve, and itself under immediate control of a pilot valve 41, the piston 40 and its pilot valve 41 being connected to the shiftable diaphragm 54 of an absolute pressure unit, generally represented at 5. This pressure unit, as shown, consists of an evacuated bellows 51, and a bellows 52 communicating by way of the duct 59 with the interior of the cabin, with the diaphragm 54 connected between the bellows 51 and 52. A head 53, which may be considered as a fixed head, closes the outer end of the bellows 52, and a similar head 55, fixed with relation to the head 53, closes the outer end of the evacuated bellows 51. A tension spring 56, adjustable by means such as the screw 56, urges the diaphragm 54 towards the head 53, but this force is resisted by the effect of the pressure within the cabin acting, within the bellows 52, upon diaphragm 54 in opposition to the spring 56. A true balance between such cabin pressure and the spring is thus obtained because the evacuated bellows 51 between the opposite side of the diaphragm 54 and the head 55 eliminates the effect of any other force on such diaphragm. These two forces are thus brought into equilibrium at some particular setting of the diaphragm 54.

In any such position of equilibrium the pilot valve 41 is closed, but upon disturbance of their equilibrium the pilot valve 41 opens in one direction or the other, thereby effecting corresponding movement of the servo piston 40, and in consequence corrective movement of the connected valve 4, and adjustment correspondingly of the speed of the supercharger. For instance, if the cabin pressure tends to increase more than is proper, the diaphragm 54 will be moved to the right by it against the tension of spring 56, as will the pilot valve 41; the servo piston 40 will then be moved to the left by a pressure fluid entering at 42, and this will shift the control valve 4 in a direction to close it farther, thereby reducing the amount of fluid effective within the fluid drive unit 12 and thereby slowing down the supercharger 1. Follow-up movement of the piston will restore the pilot valve 41 to neutral position, through the linkage shown, and parts will then remain in the new position of equilibrium. Should the cabin pressure drop, the reverse action will take place, and the supercharger will speed up.

Were the structure of the cabin 9 sufficiently strong and air-tight under all conditions of pressure difference, as between the cabin and the exterior, the absolute pressure control 5 might be adequate under all conditions, but this is scarcely practicable. Usually the cabin structure is designed to hold a maximum differential of pressure, and it is desirable to provide overriding and automatically operable means to prevent the pressure in the cabin ever exceeding that differential over external pressure. To that end there is provided the differential pressure control means, generally represented at 6.

This differential pressure control, as shown in the drawing, consists of a stem 65 connected to shift the absolute pressure control device 5 as a unit. It is connected, for instance, to the head 53, which in turn is connected to the opposite head 55 by the bellows 51, to move the unit along the guides 57, and when such movement is made, corresponding adjustment is accomplished of the pilot valve 41 with the same results as before.

The stem 65 is shouldered at 60 for engagement by a pressure sensitive member or piston 61, when moved in opposition to force means, represented by a spring 62, engaging such portion. The pressure sensitive member or piston is thus moved by cabin pressure supplied through the conduit 63 acting against its left surface, as opposed by atmospheric pressure communicated to the opposite side of the piston 61 through the duct 64 acting on its right surface of substantially equal area, and by the force exerted by spring 62. When atmospheric pressure and cabin pressure are not widely different the spring 62 will hold the piston 61 away from the shoulder 60. At a given value, for which the spring 62 is set to exert on piston 61 a substantially uniform force corresponding to a predetermined differential of cabin pressure over external pressure at various altitudes, and for which it can be adjusted to select different desired given values by means not shown but known and readily applicable, the piston engages the shoulder 60 and commences to move the stem 65 to the right. In so doing, as has already been described, the servo piston 40 is caused to move in a direction to increase the choking of the passage through the control valve 4, thereby slowing down the supercharger 1 and decreasing the pressure within the cabin 1. Since this action occurs only when the external pressure has dropped, and if by this action the cabin pressure drops correspondingly, it follows that the cabin pressure is never permitted to exceed the external pressure by more than the predetermined differential corresponding to the value for which the spring 62 of differential pressure control 6 has been set.

The absolute pressure control 5 and the differential pressure control 6 may be part of a common unit, within the enclosure 99 represented in phantom, and this unit may be located within the cabin, adjacent the engine 90, or in any other convenient position.

What we claim as our invention is:

1. Aircraft cabin pressure control mechanism, comprising means to supply air under pressure to the cabin, an outlet for outflow of air from the cabin, valve means controlling outflow of air from the cabin through said outlet, means sensitive to outflow of air from the cabin through said outlet and operatively connected to control movement of said valve means to regulate outflow of air from the cabin past said outflow sensitive means and said valve means, tending to maintain a constant rate of air outflow through said outlet, and pressure-sensitive means exposed to cabin pressure and operatively connected to said air supply means to regulate the supply of air to the cabin for controlling the cabin pressure.

2. Aircraft cabin pressure control mechanism, comprising means to supply air under pressure to the cabin, an outlet for outflow of air from the cabin, valve means controlling outflow of air from the cabin through said outlet, means sensitive to outflow of air from the cabin through said outlet at the discharge side of said valve means and insensitive to cabin pressure, operatively connected to control movement of said valve means to regulate outflow of air from the cabin past said outflow sensitive means and said valve means, tending to maintain a constant rate of air outflow through said outlet, and pressure-sensitive means exposed to cabin pressure and operatively connected to said air supply means to regulate the supply of air to the cabin for controlling the cabin pressure.

3. Aircraft cabin pressure control mechanism, comprising an inlet duct communicating with the cabin, means to supply air under pressure to the cabin through said inlet duct, an outlet duct for flow of air from the cabin, valve means controlling outflow of air from the cabin through said outlet duct, means sensitive to flow of air through one of said ducts and operable to regulate said valve means for controlling the outflow of air through said outlet duct, means sensitive to absolute cabin pressure and operatively connected to said air supply means to regulate the supply of air to the cabin tending to maintain a substantially constant cabin pressure, and means sensitive to the difference of cabin pressure over atmospheric pressure, also operatively connected to said air supply means, and always operable to override said absolute-pressure sensitive means to limit the supply of air to the cabin to prevent the differential of cabin pressure over atmospheric pressure exceeding a predetermined value.

4. Aircraft cabin pressure control mechanism, comprising an inlet duct communicating with the cabin, means to supply air under pressure to the cabin through said inlet duct, an outlet duct for flow of air from the cabin, means exposed to cabin pressure and operatively connected to said air supply means to regulate the supply of air to the cabin to establish and maintain a cabin pressure higher than atmospheric pressure, means operable under the influence of air flow through one of said ducts to vary the rate of air outflow from the cabin through said outlet duct, to maintain a predetermined air outflow rate, and overriding means operatively connected to said air supply means, and sensitive to the pressure differential of cabin pressure over atmospheric pressure, always operable upon the attainment of a selected differential of cabin pressure over atmospheric pressure to actuate said air supply means to prevent cabin pressure exceeding atmospheric pressure by more than such selected pressure differential.

5. Aircraft cabin pressure control mechanism, comprising an inlet duct communicating with the cabin, means to supply air under pressure to the cabin through said inlet duct, an outlet duct for flow of air from the cabin, means exposed to cabin pressure and operatively connected to said air supply means to regulate the supply of air to the cabin conformably to the rate of air outflow to maintain the cabin pressure substantially constant, means operable under the influence of air flow through one of said ducts to vary the rate of air outflow from the cabin through said outlet duct, to maintain a predetermined air outflow rate, and overriding means operatively connected to said air supply means, and sensitive to the pressure differential of cabin pressure over atmospheric pressure, always operable upon the attainment of a selected differential of cabin pressure over atmospheric pressure to actuate said air supply means to prevent cabin pressure exceeding atmospheric pressure by more than such selected pressure differential.

6. Aircraft cabin pressure control mechanism, comprising an inlet duct communicating with the cabin, means to supply air under pressure to the cabin through said inlet duct, an outlet duct for outflow of air from the cabin, valve means controlling outflow of air from the cabin through said outlet duct, means sensitive to flow of air through one of said ducts and operable to regulate said valve means for controlling the outflow of air through said outlet duct, and differential pressure control means including force means operable to exert a substantially uniform force corresponding to a predetermined differential of cabin pressure over external pressure at various altitudes, and a pressure sensitive member engaged by said force means, having surfaces of substantially equal area exposed to cabin pressure and to atmospheric pressure, movable by the difference in such pressures on such surfaces opposed solely by the force exerted on said pressure sensitive member by said force means, and operatively connected to said air supply means to limit the supply of air supplied thereby to the cabin, to prevent the differential of cabin pressure over atmospheric pressure exceeding a predetermined value.

ALFRED B. JEPSON.
JAMES B. COOPER.